March 22, 1932.  W. W. WOODWARD  1,850,904
ROTATING PISTON ENGINE
Filed March 19, 1930   3 Sheets-Sheet 1

WITNESSES

INVENTOR
W. W. Woodward
BY Munn & Co
ATTORNEYS

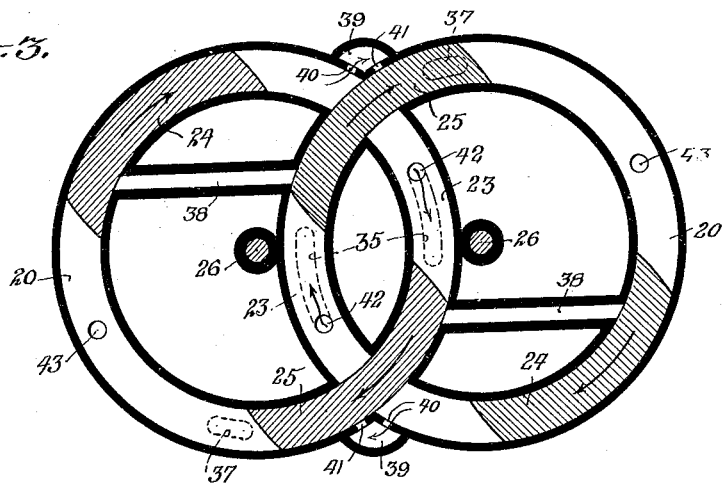
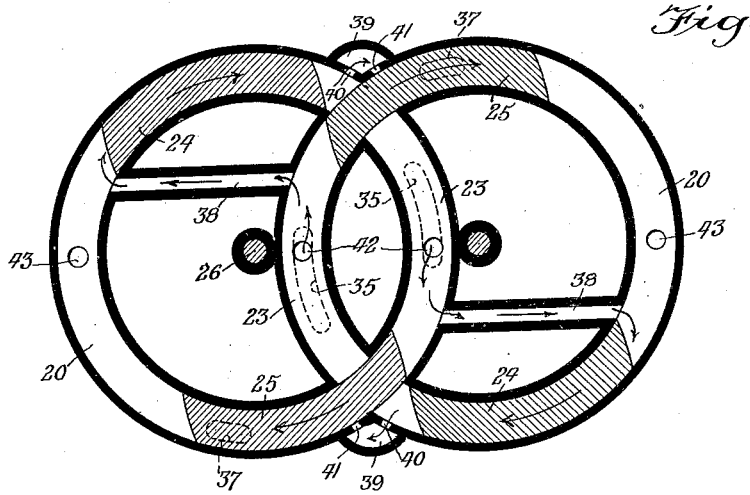

March 22, 1932.  W. W. WOODWARD  1,850,904

ROTATING PISTON ENGINE

Filed March 19, 1930    3 Sheets-Sheet 3

WITNESSES

INVENTOR
W. W. Woodward
BY Munn & Co
ATTORNEYS

Patented Mar. 22, 1932

1,850,904

UNITED STATES PATENT OFFICE

WALTER W. WOODWARD, OF SILVER CITY, NEW MEXICO, ASSIGNOR OF ONE-HALF TO FRANK LIGHT, OF SILVER CITY, NEW MEXICO

ROTATING PISTON ENGINE

Application filed March 19, 1930. Serial No. 437,161.

This invention relates to internal combustion engines, pumps, compressors, and closely analogous engines or machines.

The invention has for its general objects to improve and simplify the construction of engines or machines of the indicated characters to increase the efficiency thereof, and particularly with relation to internal combustion engines, so as to eliminate the usual valves, their rods, cams, and springs and also crank shafts and connecting rods.

Figure 1:
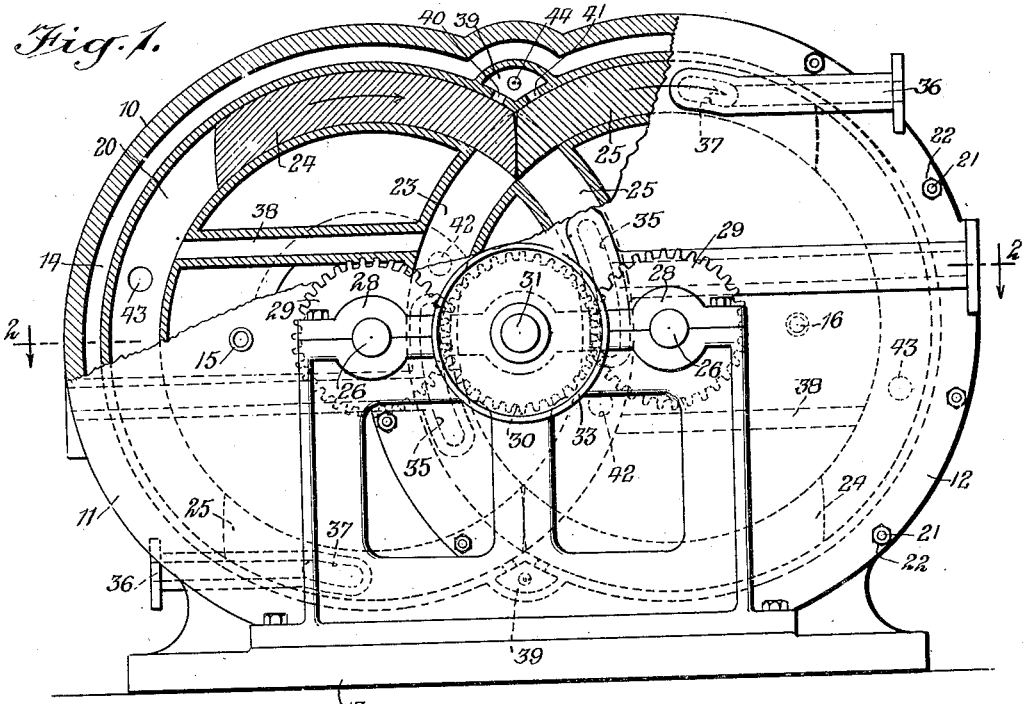
Figure 2:
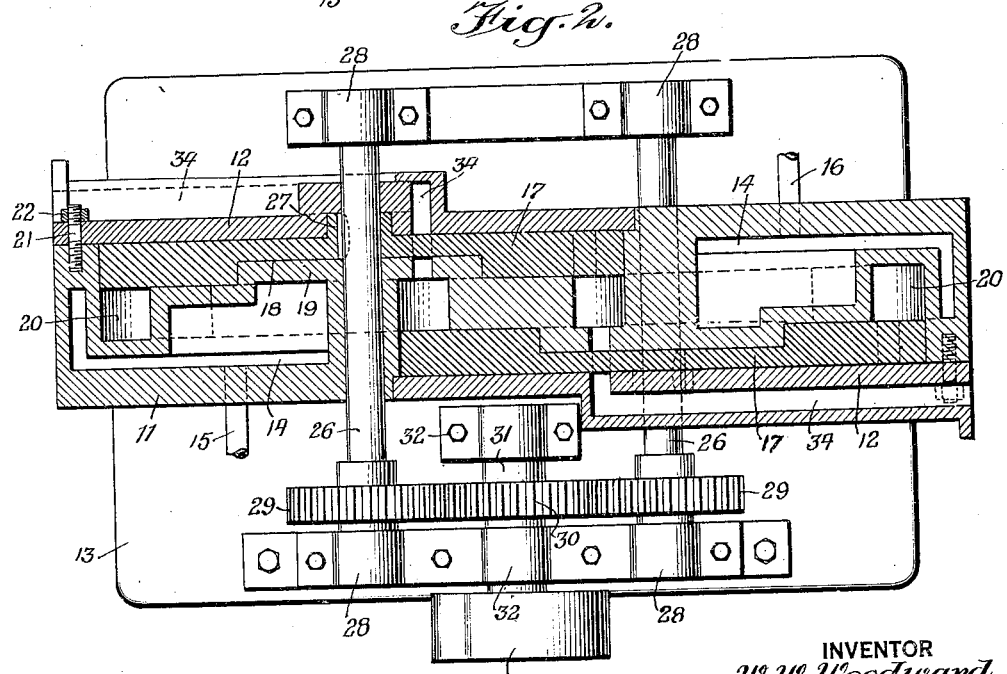
Figure 5:
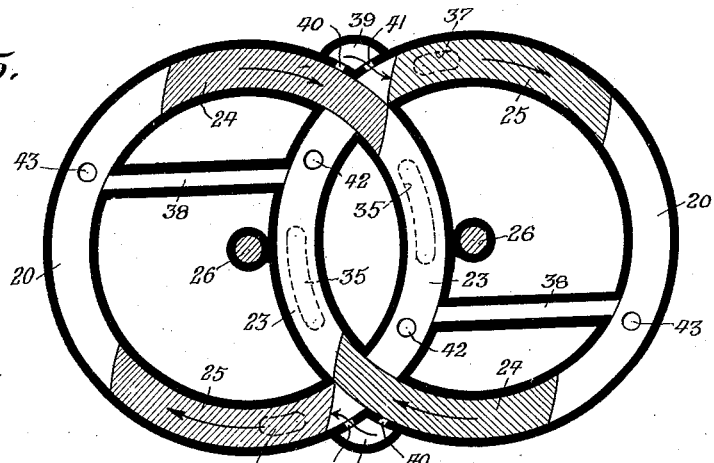
Figure 7:
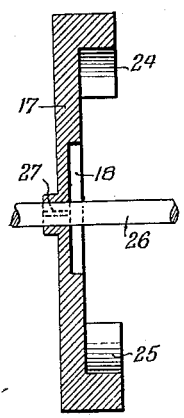
Figure 6:
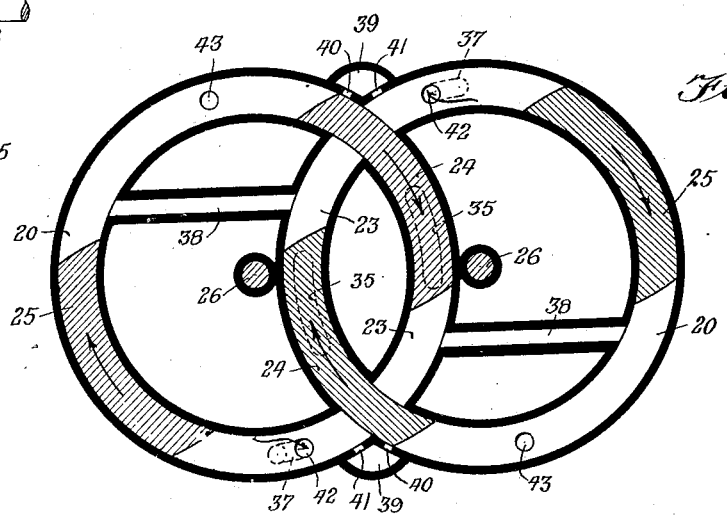

With the foregoing, other objects of the invention will appear from the embodiment of the invention which, by way of example, is described in the following specification and illustrated in the accompanying drawings, in which Figure 1 is a side view of a rotary internal combustion engine selected to illustrate the features of the invention, the same being shown partly in section;

Figure 2 is a section taken substantially on the line 2—2 of Figure 1;

Figures 3 to 6, inclusive, are diagrammatic views showing different stages in the operation of the engine; Figure 3 showing one stage of compression and intake of fuel; Figure 4 showing an advanced state of compression and by-passing of fuel; Figure 5 showing firing of compressed charges of fuel; and Figure 6 showing discharge of exhaust gases;

Figure 7 is a section of one of the piston disks.

In the illustrated embodiment of the invention there is shown a casing 10 which comprises three principal parts, a part 11 and two substantially similar parts 12. The part 11 is of hollow construction and is integral with or secured to a base 13, the latter serving for securing the casing 10 in place. The part 11 has a water space 14 through which water circulates by virtue of an inlet 15 and an outlet 16 for the purpose of cooling the engine. The part 11 has circular recesses in the opposite sides thereof which respectively accommodate disks 17. Each disk 17 has a circular recess 18 in one face thereof which receives a boss 19 on the part 11, which boss serves as a bearing for the disk. Each disk 17 combines with the part 11 to form a circular channel 20. The disks 17 are held in place by the parts 12 respectively of the casing 10, each part 12 being in the form of a circular plate or head secured in place by studs 21 which are screwed into the part 11 and extend through the part 12, together with nuts 22 applied respectively to the studs 21.

In accordance with one of the distinguishing features of the invention, it will be apparent that there are provided two circular channels 20 which intersect each other at two points so as to be in communication with each other. By reason of the fact that the circular channels 20 intersect each other at two points there are provided two arcuate sections 23, each of which is approximately equal to one-fourth the circumference of each channel. Arranged on each of the disks 17 in fixed relation thereto are sector-shaped or arcuate pistons 24 and 25. These pistons 24 and 25 may be formed integral with the related disk or be secured thereto in any practical manner, and may be rounded in cross section or square in cross section as shown in the present instance. These pistons 24 and 25 are arranged circumferentially of the related disk 17, or, in other words, are arranged diametrically opposite each other, and have a fixed relation with respect to each other. The pistons 24 and 25 are adapted to traverse the channel 20 of their related disk 17. These pistons 24 and 25 of the disks 17 are so proportioned that they will traverse the channels 20 and clear each other in their movement, yet co-operate with each other to produce the necessary compression of fuel and also produce a suction action to draw fuel into the channels 20.

In accordance with another feature of the invention, the disks 17 and their pistons 24 and 25 are maintained in a constant definite relationship, and are caused to rotate in the same direction. To this end there are provided shafts 26, one for each of the disks 17, the shaft being keyed as at 27 to the related disk 17. Each shaft 26 extends through the part 11 of the casing and the related part 12, and the opposite ends thereof are journaled for rotation in bearings 28 on the base 13. The shafts 26 are geared together by gears 29 respectively secured to the shafts 26 and an intermediate gear 30 which meshes with the gears 29 and which is keyed fast to a shaft 31 supported for rotation by bearings 32 on the base 13. The shaft 31 has a pulley 33 fast thereon. It will now be understood that the pistons 24 and 25 of each disk 17 move in unison in the related circular channel 20.

Each of the circular channels 20 has a fuel intake 34 which terminates at one end in a relatively wide, elongated, arcuate mouth 35 which opens directly into the section 23 of the channel 20. Each channel 20 also has an exhaust passage or outlet 36 which terminates at one end in a relatively wide or elongated arcuate mouth 37 which opens directly into the related channel 20. The channels 20 are in communication with each other by passages 38. Each passage 38 leads from the section 23 of one channel 20 beyond the intake mouth 35 thereof to the other channel 20.

In accordance with another feature of the invention there are provided compression or combustion chambers 39 respectively at the points of intersection of the channels 20 with each other. Each chamber has an intake port 40 and an outlet port 41 which communicate respectively with the channels 20. The pistons 24 and 25 of each channel are each adapted to alternately close and open the outlet port 41 of one combustion chamber 39 and to close and open the inlet port 40 of the other combustion chamber 39 with each cycle of the pistons. The four pistons also serve to open and close the opposite ends of the passages 38 with each cycle thereof. Each disk 17 has ports 42 and 43 therein which are arranged diametrically opposite each other which are adapted to be brought into and out of registration with the mouths 35 and 37 respectively of the intake 34 and outlet 36 of the related channel 20.

The operation of the engine is as follows: Referring now to Figure 3 it will be apparent that the disks 17 are in such relative positions that their ports 42 will be in registry respectively with the intake mouths 35, that the pistons 24 and 25 will be disposed to close the opposite ends of the passages 38, and that the pistons 25 will also close the outlet ports 41 of the combustion chambers 39 while the intake ports 40 thereof remain open. As the pistons travel in the direction indicated by the arrows, the pistons 24 will co-operate with the pistons 25 to compress the charge of fuel which will be admitted to the channels 20 in advance of the pistons 24. During the relative forward movement of the pistons 24 and 25 the fuel charges will be compressed into the combustion chambers 39, and at the same time a new supply of fuel will be admitted from the intakes 34 into the channels 20 through the passages 38 in advance of the pistons 25 as shown in Figure 4. As the pistons 24 and 25 continue to move forwardly, the intake ports 40 of the combustion chambers 39 will be closed by the pistons 24, and the outlet ports 41 of the combustion chambers 39 will be opened by the pistons 25. At this time and for a short interval prior thereto the pistons 24 and 25 will be in contact with each other. On reference to Figure 5 it will be apparent that the intake ports 40 of the combustion chambers 39 are closed and the outlet ports 41 are opened. It will also be apparent that charges of fuel will be compressed within the chambers 39 and that these charges when exploded will pass out of the chambers 39 through the outlet ports 41 against the impact ends of the pistons 25, driving the pistons 24 and 25 and their disks 17 around in a clockwise direction. Suitable ignition means including spark plugs, one of which is indicated at 44 in Figure 1 of the drawing, may be provided to ignite the charges within the chambers 39 at proper intervals. It will also be apparent that, after the charges of fuel have been exploded to act on the pistons 25, the ports 42 which previously registered with the intake mouths 35 will register with the mouths 37 of the outlets 36, thereby allowing the burnt gases to be discharged from the channels 20. This action takes place one-half cycle of the pistons 24 and 25. In the other half cycle of the pistons, the pistons 24 become the driving pistons and are acted on by the force of the compressed charges delivered to the combustion chambers 39. The ports 43 and the disks 17 serve for admitting fuel charges into the channels 20 through the intake mouths 35, and to allow the discharge of the burnt gases through the mouths 37 of the outlets 36 in concerted action with the pistons 24. On reference to Figure 5 it will be apparent that as the pistons 25 are being acted on by the force of the exploded charges of fuel passing from the chambers 39, fresh supplies of fuel will be carried around by the pistons 25 which will subsequently be compressed into the chambers 39 by reason of the co-operation of the pistons 24 with the pistons 25. It will therefore be understood that each of the pistons 24 is acted on by the force of an exploded charge and also each piston 25 is similarly acted on with each cycle or single revolution of the disks 17, to drive the disks 17 in the same direction. This driving force will be imparted to the shafts 26, and from the shafts 26 to the shaft 31 through the intervention of the gears 29 and 30, causing the shaft 31 to rotate in a counter-clockwise direction. This shaft 31 may serve as a power transmitting shaft for any desired purpose.

It is to be understood that the invention is not limited alone to the class of rotary internal combustion engines, but that the combustion chambers 39 may be omitted in order that embodiments of the invention may be produced to serve as steam engines, pumps, compressors, and closely analogous machines. It is to be understood that in the case of pumps and compressors the shaft 31, gears 29 and 30 and shafts 26 will serve to drive the disks 17 and their pistons 24 and 25.

It is to be understood that the invention is not restricted to the precise arrangement of parts shown and described, as details of construction may be modified and rearranged without departing from the spirit of the invention, the scope of which is limited only by the terms of the appended claims.

Claims:

1. In a rotary internal combustion engine, the combination of a casing having intersecting circular channels therein, pistons movable in unison in each channel, combustion chambers, each combustion chamber having an inlet and an outlet, the inlets of the combustion chambers being in communication respectively with said channels and the outlets also being in communication respectively with said channels, an inlet and an outlet for each channel, the pistons of each channel being adapted to alternately close and open the outlet of one combustion chamber and to close and open the inlet of the other combustion chamber with each cycle thereof, and means operated by the pistons of each channel to alternately open and close the inlet and open and close the outlet thereof with each cycle of the pistons.

2. In an internal combustion engine, the combination of a casing having intersecting circular channels therein, a combustion chamber provided with an inlet and an outlet respectively in communication with said channels, pistons adapted to operate respectively in said channels, said pistons being cooperative and being adapted to close and open said inlet and outlet whereby to admit a charge of fuel compressed thereby into the combustion chamber and to release the expanding charge therefrom to act thereon with each cycle of said pistons, and fuel inlet and exhaust outlet means for the channels.

3. In a machine of the class described, the combination of a casing having intersecting circular channels therein, a rotatable disk for each of said channels, pistons arranged in fixed spaced relation circumferentially of each disk and disposed to operate in each channel, said disks being operatively connected to rotate in unison and in the same direction, each of said channels having a fluid inlet and outlet, and each disk having ports therein for the purpose of opening and closing the inlet and the outlet of the related channel with each cycle of the disk, and passages each communicating at their opposite ends respectively with said channels to allow fluid to pass from one channel to the other channel, the opposite ends of said passages being opened and closed simultaneously by the pistons of both channels in the movement of the pistons to control the flow of fluid from one channel to the other channel.

WALTER W. WOODWARD.